(No Model.)
F. H. SPRANG.
PNEUMATIC TIRE.
No. 504,793.  Patented Sept. 12, 1893.
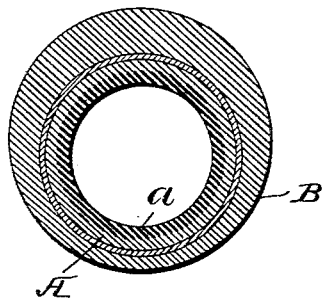

UNITED STATES PATENT OFFICE.

FREDERICK HENRY SPRANG, OF LONDON, ENGLAND.

PNEUMATIC TIRE.

SPECIFICATION forming part of Letters Patent No. 504,793, dated September 12, 1893.

Application filed May 16, 1893. Serial No. 474,453. (No model.)

*To all whom it may concern:*

Be it known that I, FREDERICK HENRY SPRANG, a subject of the Queen of England, residing at West Norwood, London, England, have invented certain new and useful Improvements in Pneumatic Tires, of which the following is a specification.

My invention relates to an improved method of manufacturing or treating india rubber tubes adapted for use in or with pneumatic tires to contain the air, the object being to render the said tubes self-healing or closing when punctured. According to my invention I take a tube made of india-rubber and after vulcanizing it by any of the known processes, I cause it to absorb any suitable oil preferably animal or vegetable. The rubber by absorbing the oil becomes increased in volume and of such a nature that when it is pierced and the article of puncture withdrawn the hole made thereby automatically closes up. The tubes may be treated with the oil either on their internal surfaces, their external surfaces, or on both surfaces, and the oil may be applied in any suitable and convenient manner, either before, during, or after the construction of the tire.

In the accompanying drawing, I have shown a cross-sectional view of one form of tire to which my invention is applied, and in which A represents the rubber tube, the portion *a* having absorbed the oil, and B represents an inclosing cover for the tube. In use these air tubes are preferably inclosed in a canvas bag or pocket or a cover and I prefer to make them of such a size and length that they are subjected to no strain or expansion when inflated.

I wish it to be understood that my invention is applicable to all types of pneumatic tires whether made with separate air tubes, or with the air tubes formed as part of the tires as in the type known as "solid-wall" tires.

The invention may be applied by merely pouring oil into the tube which absorbs it to the required extent or amount, after which the oil is withdrawn; old tubes can be treated just as well as new ones. The oil may be applied with a brush or the like where that is practicable and it is preferable that only a portion of the total thickness of the rubber should absorb the oil—say one half or two thirds.

I am aware that oil has before now been used for masticating raw rubber and to keep it soft during vulcanizing; but never after vulcanizing or for the purpose of increasing the bulk or volume of a portion of the rubber for the purpose of closing punctures.

I claim—

1. The treatment of rubber with oil after vulcanizing whereby the bulk or volume of that portion of the rubber which has absorbed the oil is increased.

2. A pneumatic tube or tire treated with oil after vulcanizing.

3. A pneumatic tube or tire in which a portion only of the thickness of the rubber has absorbed the oil.

4. A pneumatic tire consisting of an air tube which has absorbed oil after vulcanizing and a cover.

5. A pneumatic tire consisting of an air tube which has absorbed oil after vulcanizing a canvas pocket and an outer cover.

6. A pneumatic tire consisting of an air tube which has absorbed oil after vulcanizing.

In testimony whereof I have hereto set my hand in the presence of the two subscribing witnesses.

FREDERICK HENRY SPRANG.

Witnesses:
ALFRED J. BOULT,
HARRY B. BRIDGES.